(12) United States Patent
Li

(10) Patent No.: US 12,096,779 B1
(45) Date of Patent: Sep. 24, 2024

(54) CONVENIENT FOOD SMOKER

(71) Applicant: Anzhang Li, Shenzhen (CN)

(72) Inventor: Anzhang Li, Shenzhen (CN)

(73) Assignee: Anzhang Li, Shenzhen (CN)

( * ) Notice: Subject to any disclaimer, the term of this patent is extended or adjusted under 35 U.S.C. 154(b) by 0 days.

(21) Appl. No.: 18/433,310

(22) Filed: Feb. 5, 2024

(51) Int. Cl.
*A23B 4/052* (2006.01)

(52) U.S. Cl.
CPC .................................... *A23B 4/052* (2013.01)

(58) Field of Classification Search
CPC ...................................................... A23B 4/052
USPC ........................................................... 99/482
See application file for complete search history.

(56) References Cited

U.S. PATENT DOCUMENTS

| | | | | |
|---|---|---|---|---|
| 2,611,311 A | * | 9/1952 | Irwin ..................... | A23B 4/052 126/25 B |
| 3,316,831 A | * | 5/1967 | Koland .................. | A23B 4/052 99/402 |
| 3,472,151 A | * | 10/1969 | Cox ..................... | A47J 37/0704 99/474 |
| 3,841,211 A | * | 10/1974 | Ellis ..................... | A47J 37/0709 126/25 R |
| 3,882,767 A | * | 5/1975 | Oyler ....................... | A21B 1/24 126/21 R |
| 4,076,008 A | * | 2/1978 | Deaton ................... | A47J 37/00 126/25 R |
| 4,094,295 A | * | 6/1978 | Boswell ............... | A47J 37/0704 99/417 |
| 4,307,659 A | * | 12/1981 | Martin .................... | A47J 37/06 99/446 |
| 4,348,948 A | * | 9/1982 | Allison ................. | A47J 37/046 126/18 |
| 4,665,891 A | * | 5/1987 | Nemec .................. | A23B 4/052 126/25 R |
| 4,700,618 A | * | 10/1987 | Cox, Jr. ................. | A23B 4/052 99/481 |
| 4,721,037 A | * | 1/1988 | Blosnich ............. | A47J 37/0704 99/481 |
| 4,757,756 A | * | 7/1988 | Van Marr .......... | A47J 37/0704 99/476 |
| 4,770,157 A | * | 9/1988 | Shepherd ............ | A47J 37/0713 126/25 R |
| 4,869,163 A | * | 9/1989 | Haskins .............. | A47J 37/0713 99/481 |

(Continued)

FOREIGN PATENT DOCUMENTS

| | | |
|---|---|---|
| CN | 207885598 U | 9/2018 |
| CN | 209732459 U | 12/2019 |
| CN | 219981981 U | 11/2023 |

*Primary Examiner* — Jimmy Chou
(74) *Attorney, Agent, or Firm* — Nitin Kaushik

(57) ABSTRACT

The present invention relates to the field of smoking technologies, and in particular to, a convenient food smoker. The food smoker includes a combustion assembly and a mixture assembly, where the combustion assembly communicates with the mixture assembly and further includes a heat-resistant handle connected to the combustion assembly. The present invention is provided with a separate combustion chamber and a multifunctional mixing chamber. During use, smoke generated in the combustion chamber can be guided into the multifunctional mixing chamber via a connection pipe, facilitating more uniform action of smoke on the surface of the food.

8 Claims, 3 Drawing Sheets

(56) References Cited

U.S. PATENT DOCUMENTS

| | | | | |
|---|---|---|---|---|
| 5,144,939 A * | 9/1992 | Christopherson | F24B 1/202 | |
| | | | 110/118 | |
| 5,195,423 A * | 3/1993 | Beller | A47J 37/0704 | |
| | | | 99/450 | |
| 5,673,613 A * | 10/1997 | Price | A21B 3/04 | |
| | | | 126/369 | |
| 5,768,977 A * | 6/1998 | Parris | A47J 37/0704 | |
| | | | 99/417 | |
| 5,996,572 A * | 12/1999 | Ilagan | A47J 37/0786 | |
| | | | 126/30 | |
| 6,012,381 A * | 1/2000 | Hawn | A47J 37/0713 | |
| | | | 99/450 | |
| 6,705,213 B1 * | 3/2004 | Thomas | A47J 37/0786 | |
| | | | 99/482 | |
| 6,874,496 B2 * | 4/2005 | Waits | A47J 37/0704 | |
| | | | 126/25 R | |
| 7,159,509 B2 * | 1/2007 | Starkey | A47J 37/0704 | |
| | | | 126/25 R | |
| 7,681,493 B2 * | 3/2010 | Moore | A23B 4/052 | |
| | | | 99/481 | |
| 7,895,942 B2 * | 3/2011 | Karau | A47J 37/0704 | |
| | | | 99/481 | |
| 8,720,322 B2 * | 5/2014 | West | A47J 37/0704 | |
| | | | 99/385 | |
| 9,526,376 B2 * | 12/2016 | Karau | A47J 37/0754 | |
| 9,693,569 B2 * | 7/2017 | Wingerd | A23B 4/052 | |
| 10,653,272 B2 * | 5/2020 | Karau | A47J 37/0786 | |
| 11,641,969 B2 * | 5/2023 | Bourgeois | A47J 43/18 | |
| | | | 426/523 | |
| 2007/0131234 A1 * | 6/2007 | Moore | A23B 4/052 | |
| | | | 131/296 | |
| 2007/0137503 A1 * | 6/2007 | Traeger | A23B 4/052 | |
| | | | 99/482 | |
| 2008/0047541 A1 * | 2/2008 | Fou | A47J 37/07 | |
| | | | 126/25 R | |
| 2008/0268121 A1 * | 10/2008 | Karau | A47J 37/0786 | |
| | | | 426/523 | |
| 2010/0218691 A1 * | 9/2010 | Adams | A23B 4/052 | |
| | | | 99/482 | |
| 2011/0094496 A1 * | 4/2011 | McCown | F23L 11/00 | |
| | | | 126/289 | |
| 2014/0026765 A1 * | 1/2014 | Fou | A23B 4/0523 | |
| | | | 99/445 | |
| 2014/0299005 A1 * | 10/2014 | Vinett | A23B 4/052 | |
| | | | 99/482 | |
| 2015/0096448 A1 * | 4/2015 | Wingerd | A23B 4/052 | |
| | | | 99/482 | |
| 2017/0238566 A1 * | 8/2017 | Smith | A23B 4/052 | |
| 2018/0332866 A1 * | 11/2018 | Mahan | B65B 31/024 | |
| 2021/0113016 A1 * | 4/2021 | Dean | A47J 37/0786 | |
| 2021/0251248 A1 * | 8/2021 | Powell | A23B 4/0523 | |
| 2022/0046937 A1 * | 2/2022 | Simon | A23L 5/17 | |
| 2022/0132874 A1 * | 5/2022 | Dean | A47J 37/0704 | |
| | | | 99/474 | |
| 2023/0255218 A1 * | 8/2023 | Pla Cortes | A23B 4/044 | |
| | | | 99/323.1 | |

\* cited by examiner

CONVENIENT FOOD SMOKER

TECHNICAL FIELD

The present invention relates to the field of smoking technologies, and in particular to, a convenient food smoker.

BACKGROUND

A food smoker is mainly used to add a smoky flavor to food and designed in various types. In cooking, smoking, as a commonly used technique, is to burn woods from different trees for obtaining different wood flavors. For example, smoke produced by burning an apple wood carries the unique aroma of the apple wood. This is conducive to providing food with a distinctive fragrance and different flavor.

The smoker typically consists of a sealed container and a heating source. Some other designed products generate heat using electric heating elements or gas burners. When a smoker is used, woods are placed in the container and then ignited. When a different wood burns, it produces smoke with a distinct aroma. The smoke, upon contact with the food, permeates it over time, providing the food with a smoky flavor with a certain concentration. The smoker typically features air tightness to keep the smoke in the container, allowing for more uniform contact between it and the food. In addition to conventional smokers, some modern smokers have been designed, such as electric smokers and gas smokers.

Currently, during actual use, the smoker is typically provided with a combustion chamber, and the smoke produced by the fuel in the combustion chamber passes through a filter net and is discharged via a smoke outlet pipe. Although this manner allows the food to be smoked, the environment temperature and continuous permeation time are highly required during food smoking. When the fuel burning cannot be sustained adequately and excessive smoke and oil lead to the clogging of the pipe, it cannot be ensured that the smoke discharged from the smoke outlet pipe is sufficient and uniform, or even the fire distinguishes without smoke. As a result, this reduces the food smoking effect and affects the flavor of the food.

SUMMARY

To address the shortcomings of the prior art, the present invention provides a convenient food smoker. As compared with arrangement of only one combustion chamber in the prior art, the present invention is provided with a separate combustion chamber and a multifunctional mixing chamber. During use of the present invention, smoke generated in the combustion chamber can be guided into the multifunctional mixing chamber via a connection pipe. In this case, the multifunctional mixing chamber is equivalent to a space for storing smoke and depositing smoke and oil. Pioneeringly, in the present invention, a gravity fuel booster is disposed in the combustion chamber, ensuring that fire will not extinguish when the wood is stuck. This facilitates more uniform and continuous permeation of smoke into the surface of the food, improving the food smoking effect. The specific structure of the present invention is as follows:

A convenient food smoker is provided, including:
a combustion assembly;
a mixture assembly, where the combustion assembly communicates with the mixture assembly; and
a heat-resistant handle connected to the combustion assembly and configured for conveniently fetching the food smoker.

Preferably, the combustion assembly includes a combustion chamber, and the combustion chamber is designed to be hollow tube-shaped.

A side of the combustion chamber is fixedly connected to the heat-resistant handle; and
a multifunctional separator close to a bottom of the combustion chamber is fixed therein, and the multifunctional separator is provided with more than one smoke vent.

Preferably, a gravity fuel booster is disposed in the combustion chamber, and the gravity fuel booster includes a booster plate and a booster rod. The booster rod is fixedly connected to the booster plate, and a diameter of the booster plate is smaller than an inner diameter of the combustion chamber.

Preferably, an end of the combustion chamber close to the gravity fuel booster is provided with a first top cover, the first top cover is detachably connected to, for example, threadedly connected to or snap-fitted with, the combustion chamber, and the first top cover is slidably connected to the booster rod in a sealing manner; and an end of the combustion chamber away from the gravity fuel booster is provided with a first bottom cover, the first bottom cover is detachably connected to the combustion chamber, and a side of the combustion chamber close to the bottom cover is provided with more than one ignition hole.

Preferably, an ash container is disposed below the ignition hole, the ash container is detachably connected to the combustion chamber, and the combustion chamber is made of metal.

Preferably, the mixture assembly includes a multifunctional mixing chamber, the multifunctional mixing chamber is designed to be hollow tube-shaped, an upper end of the multifunctional mixing chamber communicates with a gas outlet spray nozzle, a side of the gas outlet spray nozzle is provided with a smoke outlet nozzle, the smoke outlet nozzle and the gas outlet spray nozzle are along a same axis, an end of the smoke outlet nozzle away from the multifunctional mixing chamber communicates with the smoke outlet pipe, and the multifunctional mixing chamber communicates with the combustion chamber via a connection pipe.

Preferably, the smoke outlet pipe is tightly locked with the smoke outlet nozzle by a hose clamp, achieving sealing connection between the smoke outlet pipe and the smoke outlet nozzle.

Preferably, an end of the multifunctional mixing chamber is connected to a fixed bracket, the fixed bracket is fixedly connected to the combustion chamber, the fixed bracket is provided with an oxygen pump, the oxygen pump is powered by a power supply assembly, and a gas outlet end of the oxygen pump communicates with the gas outlet spray nozzle.

Preferably, the oxygen pump is controlled using a controller, the controller includes a control switch and a gas volume adjusting switch, the power supply assembly includes a storage battery pack, the storage battery pack is electrically connected to the oxygen pump, and the storage battery pack is controlled using a control switch.

Preferably, a top of the multifunctional mixing chamber is provided with a second top cover, the second top cover is detachably connected to the multifunctional mixing chamber, the top of the multifunctional mixing chamber is provided with a second bottom cover, and the second bottom cover is detachably connected to the multifunctional mixing chamber.

The present invention has the following beneficial effects.

1. As compared with arrangement of only one combustion chamber in the prior art, the present invention is provided with a separate combustion chamber and a multifunctional mixing chamber. During use of the present invention, smoke generated in the combustion chamber can be guided into the multifunctional mixing chamber via a connection pipe. In this case, the multifunctional mixing chamber is equivalent to a space for storing smoke and oil, which facilitates more uniform action of smoke on the surface of the food, improving the food smoking effect, and also facilitates cleaning of the present invention after use, for example, ash removal and oil exhausting.

2. The present invention provides the gravity fuel booster. During use, gravitational force of the booster plate pushes the fuel downward in the vertical direction, and the booster plate is connected to the first top cover via a connection rod. The first top cover is lifted during fuel adding, and the booster plate moves outward for fuel adding. Then, the first top cover is covered, and the booster plate presses downward on top of the fuel to apply a continuous and downward force onto the fuel, avoiding pileup of fuel in the combustion chamber, thus allowing for full burning of the fuel. This prevents the case of "distinguishing fire" occurring to the fuel in the combustion chamber from causing non-uniform smoke or even no smoke, thus improving the food smoking effect.

3. In the present invention, after smoke enters the multifunctional mixing chamber, the oxygen pump is started using the control switch. Oxygen produced by the oxygen pump enters the multifunctional mixing chamber via the gas outlet spray nozzle. After oxygen enters the multifunctional mixing chamber, the internal pressure increases. When a mixture of oxygen and smoke enters the smoke outlet nozzle and the smoke outlet pipe from the multifunctional mixing chamber, it enters a small space from a large space, thus accelerating the flow of the gas, allowing for better permeation in the food and improving the smoking effect. Similarly, because the smoke outlet nozzle and the gas outlet spray nozzle are along the same axis, when oxygen enters the combustion chamber via the connection pipe, it also enters a small space from a large space, accelerating the flow of oxygen in the combustion chamber, thus further providing a combustion-supporting effect on the fuel, and facilitating full burning of the fuel.

BRIEF DESCRIPTION OF DRAWINGS

The present invention is further described with reference to the accompanying drawings and implementations.

Figure 1:
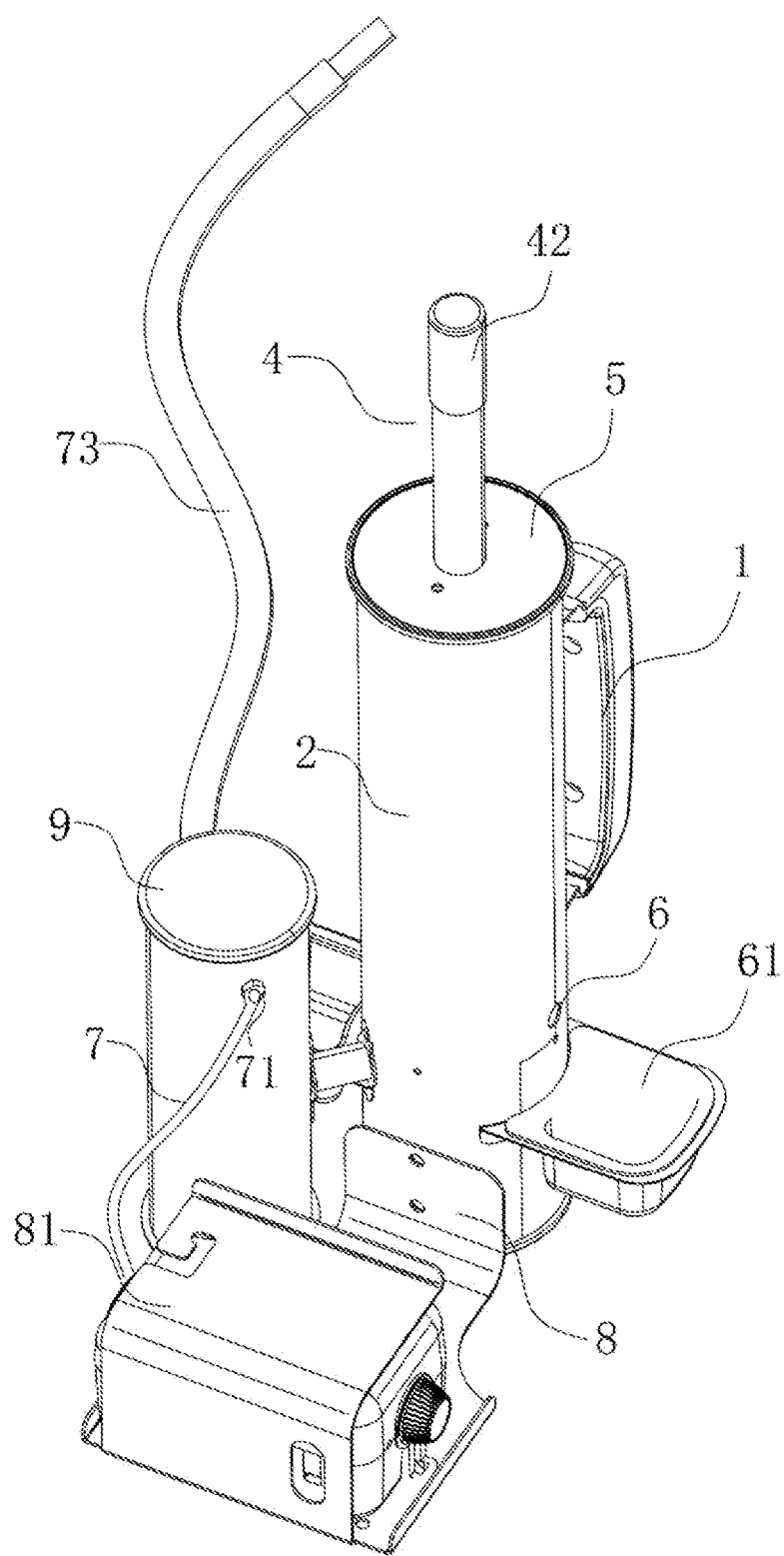
FIG. 1 is a three-dimensional diagram of the present invention.

In the accompanying drawings: heat-resistant handle 1, combustion chamber 2, multifunctional separator 3, smoke vent 31, gravity fuel booster 4, booster plate 41, booster rod 42, first top cover 5, first bottom cover 51, ignition hole 6, ash container 61, multifunctional mixing chamber 7, gas outlet spray nozzle 71, smoke outlet nozzle 72, smoke outlet pipe 73, connection pipe 74, fixed bracket 8, oxygen pump 81, second top cover 9, and a second bottom cover 91.

DETAILED DESCRIPTION OF THE EMBODIMENTS

For ease of clear understanding for the technical means, creative features, objectives, and effects achieved by the present invention, the following further elaborates the present invention with reference to specific implementations.

Figure 2:
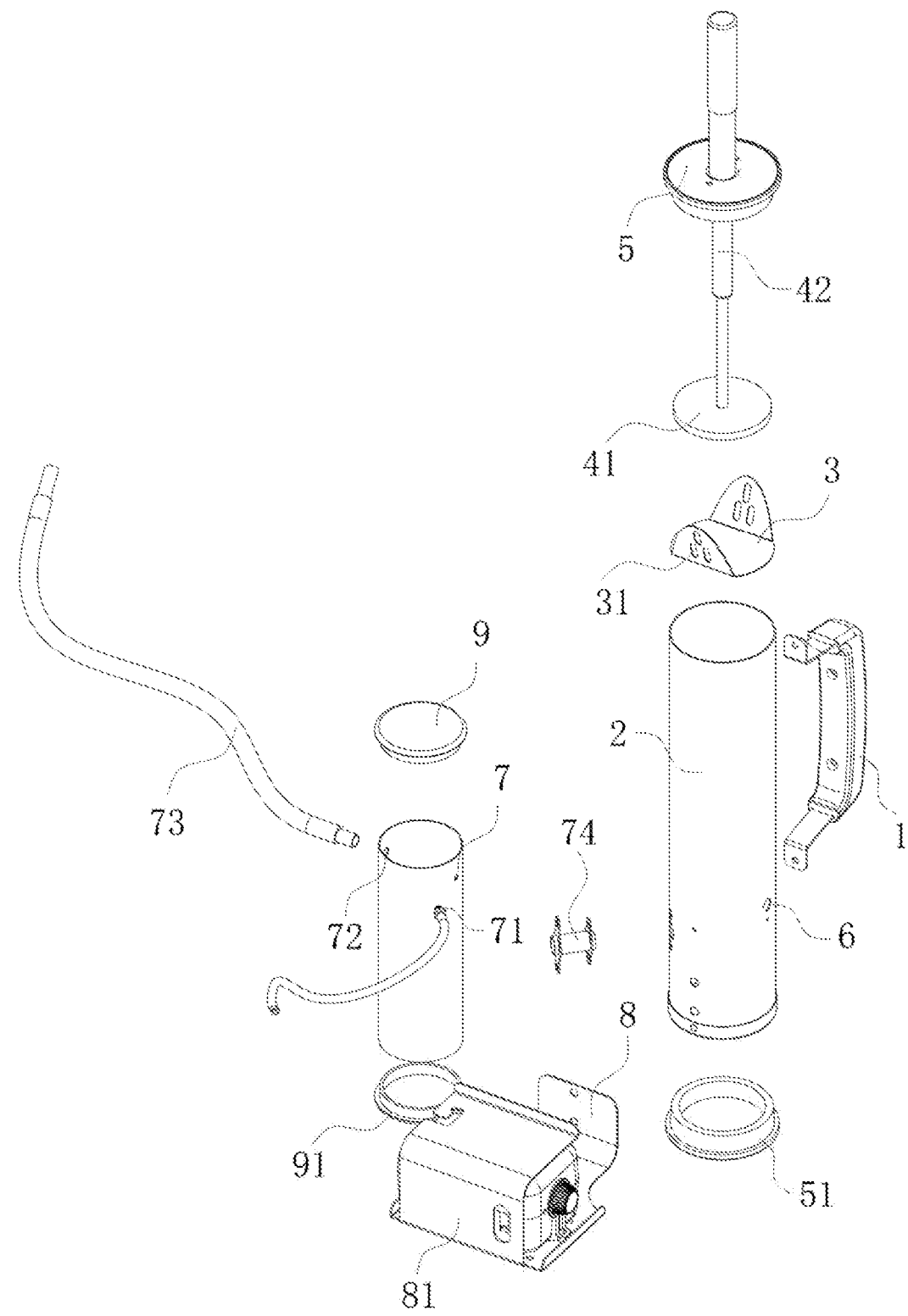
FIG. 2 is an exploded diagram of the present invention.
Figure 3:
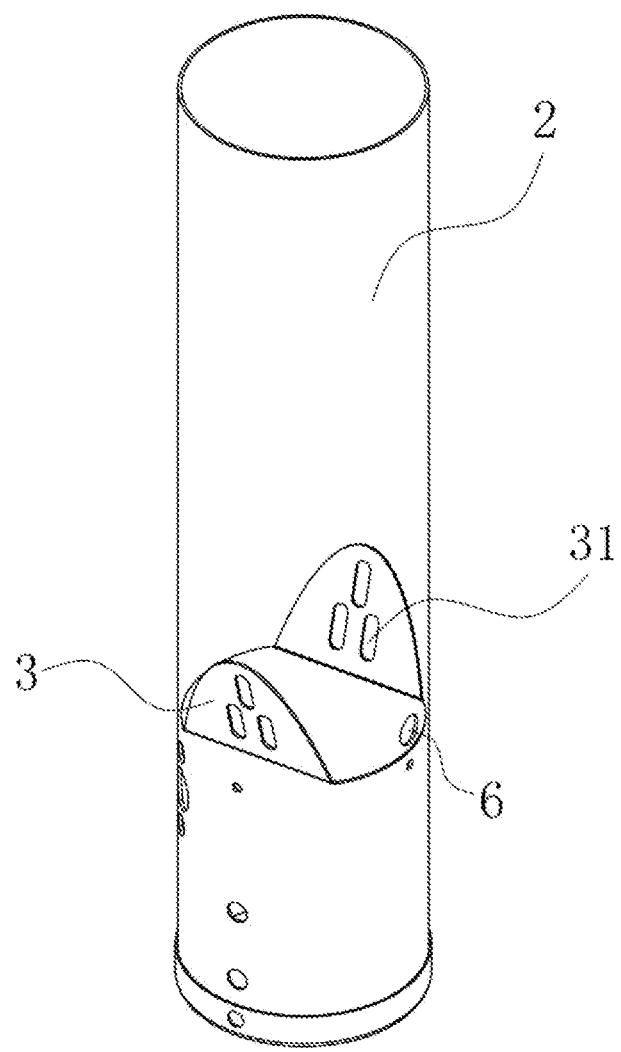
FIG. 3 is a schematic diagram of a position of a multifunctional separator in a combustion chamber according to the present invention.

As shown in FIGS. 1 to 3, the present invention provides a convenient food smoker including:
- a combustion assembly;
- a mixture assembly, where the combustion assembly communicates with the mixture assembly; and
- a heat-resistant handle 1 connected to the combustion assembly and configured for conveniently fetching the food smoker.

Specifically, the combustion assembly includes a combustion chamber 2, and the combustion chamber 2 is designed to be hollow tube-shaped.

A side of the combustion chamber 2 is fixedly connected to the heat-resistant handle 1.

A multifunctional separator 3 close to a bottom of the combustion chamber 2 is fixed therein, and the multifunctional separator 3 is provided with more than one smoke vent 31.

Specifically, a gravity fuel booster 4 is disposed in the combustion chamber 2, and the gravity fuel booster includes a booster plate 41 and a booster rod 42. The booster rod 42 is fixedly connected to the booster plate 41, and a diameter of the booster plate 41 is smaller than an inner diameter of the combustion chamber 2.

Specifically, an end of the combustion chamber 2 close to the gravity fuel booster 4 is provided with a first top cover 5, the first top cover 5 is detachably connected to, for example, threadedly connected to or snap-fitted with, the combustion chamber 2, and the first top cover 5 is slidably connected to the booster rod 42 in a sealing manner; and an end of the combustion chamber 2 away from the gravity fuel booster 4 is provided with a first bottom cover 51, and the first bottom cover 51 is detachably connected to, for example, threadedly connected to or snap-fitted with, the combustion chamber 2.

Specifically, a side of the combustion chamber 2 close to the bottom cover is provided with more than one ignition hole 6.

Specifically, an ash container 61 is disposed below the ignition hole 6, and the ash container 61 is detachably connected to the combustion chamber 2.

Specifically, the combustion chamber 2 is made of metal, a high-temperature enduring metal, thus prolonging the use time of the combustion chamber 2.

Specifically, the mixture assembly includes a multifunctional mixing chamber 7, the multifunctional mixing chamber 7 is designed to be hollow tube-shaped, an upper end of the multifunctional mixing chamber 7 communicates with a gas outlet spray nozzle 71, a side of the gas outlet spray nozzle 71 is provided with a smoke outlet nozzle 72, the smoke outlet nozzle 72 and the gas outlet spray nozzle 71 are along a same axis, an end of the smoke outlet nozzle 72 away from the multifunctional mixing chamber 7 communicates with the smoke outlet pipe 73, and the multifunctional mixing chamber 7 communicates with the combustion chamber 2 via a connection pipe 74.

Specifically, the smoke outlet pipe 73 is tightly locked with the smoke outlet nozzle 72 by a hose clamp, achieving sealing connection between the smoke outlet pipe 73 and the smoke outlet nozzle 72.

Specifically, an end of the multifunctional mixing chamber 7 is connected to a fixed bracket 8, the fixed bracket 8 is fixedly connected to the combustion chamber 2, the fixed bracket 8 is provided with an oxygen pump 81, the oxygen pump 81 is powered by a power supply assembly, and a gas outlet end of the oxygen pump 81 communicates with the gas outlet spray nozzle 71.

Specifically, the oxygen pump 81 is controlled using a controller, and the controller includes a control switch and a gas volume adjusting switch.

Specifically, the power supply assembly includes a storage battery pack, the storage battery pack is electrically connected to the oxygen pump 81, and the storage battery pack is controlled using a control switch.

Specifically, a top of the multifunctional mixing chamber 7 is provided with a second top cover 9, the second top cover 9 is detachably connected to, for example, threadedly connected to or snap-fitted with, the multifunctional mixing chamber 7, the top of the multifunctional mixing chamber 7 is provided with a second bottom cover 91, and the second bottom cover 91 is detachably connected to, for example, threadedly connected to or snap-fitted with, the multifunctional mixing chamber 7.

For further understanding of the present invention by those skilled in the art, the operating principle of the present invention is specifically described.

When food needs to be smoked, for example, a meat product is smoked, it is placed on a grill and the present invention is placed on a side of the grill. Then, the first top cover 5 is opened, fuel required for smoking, such as, wood particles are placed in the combustion chamber 2. Next, the first top cover 5 is reset and fixed to the combustion chamber 2 and the wood falls into a space formed by the multifunctional separator 3 and the combustion chamber 2 and onto the surface of the booster plate 41. An igniter is inserted into the combustion chamber 2 through the ignition hole 6 to ignite the wood. Smoke produced after the wood burns enters the multifunctional mixing chamber 7 via the smoke vent 31 and the connection pipe 74, enters the smoke outlet pipe 73 via the smoke outlet nozzle 72, and finally acts on the surface of the meat product on the grill for cold smoking or hot smoking the meat product, thus achieving the purpose of smoking the food. Therefore, as compared with arrangement of only one combustion chamber 2 in the prior art, the present invention is provided with a separate combustion chamber 2 and a multifunctional mixing chamber 7. During use of the present invention, the smoke produced in the combustion chamber 2 can be guided into the multifunctional mixing chamber 7 via the connection pipe 74. In this case, the multifunctional mixing chamber 7 is equivalent to a space for storing smoke and oil, which facilitates more continuous and uniform permeation of smoke in the food, improving the food smoking effect, and also facilitates cleaning of the present invention after use, for example, ash removal and oil exhausting. The arrangement of the heat-resistant handle 1 is conducive to, after use of the present invention or in the need of fuel addition, directly moving the present invention to a target place using the heat-resistant handle 1, thus achieving convenient fetching of the present invention.

In addition, to further improve the food smoking effect, the present invention provides the gravity fuel booster 4. During use, gravitational force of the booster plate 41 pushes the fuel downward in the vertical direction, and the booster plate 41 is connected to the first top cover 5 via a connection rod 42. The first top cover 5 is lifted during fuel adding, and the booster plate 41 moves outward for fuel adding. Then, the first top cover 5 is covered, and the booster plate 41 presses downward on top of the fuel to apply a continuous and downward force onto the fuel, avoiding pileup of fuel in the combustion chamber, thus allowing for full burning of the fuel. This prevents the case of "distinguishing fire" occurring to the fuel in the combustion chamber from causing non-uniform smoke or even no smoke, thus improving the food smoking effect. In addition, when the booster plate 41 is moved upwards, air can be drawn through the outlet hole to provide a combustion-supporting function for the fuel. This is more conducive to fully burning the fuel. And ash generated after fuel burning enters the ash container 61 for collection through the ignition hole 6.

Moreover, after smoke enters the multifunctional mixing chamber 7, the oxygen pump 81 is started using the control switch. Oxygen produced by the oxygen pump 81 enters the multifunctional mixing chamber 7 via the gas outlet spray nozzle 71. After oxygen enters the multifunctional mixing chamber 7, the internal pressure increases. When a mixture of oxygen and smoke enters the smoke outlet nozzle 72 and the smoke outlet pipe 73 from the multifunctional mixing chamber 7, it enters a small space from a large space, thus accelerating the flow of the gas, allowing for better action of the mixture on the surface of the food and improving the smoking effect. Similarly, because the smoke outlet nozzle 72 and the gas outlet spray nozzle 71 are along the same axis, when oxygen enters the combustion chamber 2 via the connection pipe 74, it also enters a small space from a large space, accelerating the flow of oxygen in the combustion chamber 2, thus further providing a combustion-supporting effect on the fuel, and facilitating full burning of the fuel.

In addition, to control the time of fuel burning, the volume of oxygen entering the multifunctional mixing chamber 7 from the oxygen pump 81 can be controlled using the gas volume adjusting switch, so as to achieve the temporal purpose of controlling the smoke to permeate the food.

At last, after the smoker is used, the ash container 61 is disassembled to clean ash piled in the ash container 61. The first top cover 5 and the first bottom cover 51 on the combustion chamber 2 are disassembled, and the second top cover 9 and the second bottom cover 91 on the multifunctional mixing chamber 7 are disassembled, to clean and maintain the combustion chamber 2 and the multifunctional mixing chamber 7. After cleaning, the smoker can be assembled again for next use It should be noted that the connection rod 32 in the present invention may be replaced by a rope, an iron chain, or a telescopic rod. During specific use, it can be replaced based on an actual use case as long as the function of the connection rod 32 in the present invention can be achieved.

In the description of the present invention, it should be noted that the terms "central", "longitudinal", "transverse", "upper", "lower", "front", "back", "left", "right", "vertical", "horizontal", "top", "bottom", "inner", "outer", and the like indicate azimuthal or positional relations on the basis of those shown in FIG. 1 only for ease of description of the present invention and for simplicity of description, and are not intended to indicate or imply that the referenced device or element must have a particular orientation and be constructed and operative in a particular orientation, and thus may not be construed as a limitation on the protection scope of the present invention. In addition, the terms "first", "second", "third", and the like are merely for distinguishing and shall not be understood as any indication or implication of relative importance.

The above illustrates and describes the basic principles, main features, and advantages of the present invention. Those skilled in the art should understand that the present invention is not limited to the foregoing embodiments. The embodiments and descriptions provided in the foregoing are merely illustrative of the principles of the present invention. Within the spirit and scope of the present invention, various changes and improvements can be made without departing from it. These changes and improvements are also within the scope of protection of the present invention. The protection scope of the present invention is defined by the appended claims and the equivalents thereof.

What is claimed is:

1. A convenient food smoker, comprising:
   a combustion assembly;
   a mixture assembly, wherein the combustion assembly communicates with the mixture assembly; and
   a heat-resistant handle connected to the combustion assembly and configured for conveniently fetching the food smoker;
   wherein the combustion assembly comprises a combustion chamber, and the combustion chamber is hollow tube-shaped;
   a side of the combustion chamber is fixedly connected to the heat-resistant handle; and
   a multifunctional separator close to a bottom of the combustion chambers is fixed therein, and the multifunctional separator is provided with more than one smoke vent,
   wherein a gravity fuel booster is disposed in the combustion chamber, and the gravity fuel booster comprises a booster plate and a booster rod, wherein the booster rod is fixedly connected to the booster plate, and a diameter of the booster plate is smaller than an inner diameter of the combustion chamber;
   wherein an end of the combustion chamber close to the gravity fuel booster is provided with a first top cover, the first top cover is detachably connected to the combustion chamber, and the first top cover is slidably connected to the booster rod in a sealing manner; and an end of the combustion chamber away from the gravity fuel booster is provided with a first bottom cover, the first bottom cover is detachably connected to the combustion chamber, and a side of the combustion chamber close to the bottom cover is provided with more than one ignition holes.

2. The convenient food smoker according to claim 1, wherein the first top cover is threadedly connected to or snap-fitted with the combustion chamber.

3. The convenient food smoker according to claim 1, wherein a ash container is disposed below the more than one ignition holes, the ash container is detachably connected to the combustion chamber, and the combustion chamber is made of metal.

4. The convenient food smoker according to claim 3, wherein the mixture assembly comprises a multifunctional mixing chamber, the multifunctional mixing chamber is hollow tube-shaped, a upper end of the multifunctional mixing chamber communicates with a gas outlet spray nozzle and the multifuctional mixing chamber communicates with the combustion chamber via a connection pipe.

5. The convenient food smoker according to claim 4, wherein the smoke outlet pipe is tightly locked with the smoke outlet nozzle by a hose clamp, achieving sealing connection between the smoke outlet pipe and the smoke outlet nozzle.

6. The convenient food smoker according to claim 5, wherein a and of the multifuctional mixing chamber is connected to a fixed bracket, the fixed bracket is fixedly connected to the combustion chamber, the fixed bracket is provided with a oxygen pump, the oxygen pump is powered by a power supply assembly, and a gas outlet end of the oxygen pump communicates with the gas outlet spray nozzle.

7. The convenient food smoker according to claim 6, wherein the oxygen pump is controlled using a controller, the controller comprises a control switch and a gas volume adjusting switch, the power supply assembly comprises a storage battery pack, the storage battery pack is electrically connected to the oxygen pump, and the storage battery pack is controlled using a control switch.

8. The convenient food smoker according to claim 7, wherein a top of the multifunctional mixing chamber is provided with a second top cover, the second top cover is detachably connected to the multifunctional mixing chamber, the top of the multifunctional mixing chamber is provided with a second bottom cover, and the second bottom cover is detachably connected to the multifunctional mixing chamber.

* * * * *